United States Patent [19]

Bender et al.

[11] Patent Number: 4,999,731

[45] Date of Patent: Mar. 12, 1991

[54] SURGE PROTECTOR FOR TELECOMMUNICATIONS SYSTEMS

[75] Inventors: David K. Bender, Tequesta; Richard R. Lathrop, Jr., Royal Palm Beach, both of Fla.

[73] Assignee: Northern Telecom Limited, Montreal, Canada

[21] Appl. No.: 511,437

[22] Filed: Apr. 13, 1990

Related U.S. Application Data

[63] Continuation of Ser. No. 899,403, Aug. 22, 1986, abandoned.

[51] Int. Cl.$^5$ .................. H02H 9/00; H01C 10/00
[52] U.S. Cl. ..................... 361/119; 361/58; 361/117; 361/126; 338/195; 338/288; 338/289
[58] Field of Search ............ 361/58, 119, 126, 117; 338/95, 195, 288, 289; 219/542

[56] References Cited

U.S. PATENT DOCUMENTS

| | | | |
|---|---|---|---|
| 3,781,749 | 12/1973 | Iles et al. | 338/23 |
| 3,860,465 | 1/1975 | Matzner et al. | 338/195 X |
| 4,160,897 | 7/1979 | Makino | 338/288 X |
| 4,197,521 | 4/1980 | Rovnyak | 338/195 |
| 4,284,970 | 8/1981 | Berrin et al. | 338/195 |
| 4,298,856 | 11/1981 | Schuchardt | 338/195 |

FOREIGN PATENT DOCUMENTS

| | | |
|---|---|---|
| 1566151 | 4/1980 | United Kingdom . |
| 2088644A | 6/1982 | United Kingdom . |
| 2122414A | 1/1984 | United Kingdom . |
| 2147480A | 5/1985 | United Kingdom . |
| 2168540A | 6/1986 | United Kingdom . |

OTHER PUBLICATIONS

Advances in Instrum, vol. 32, No. 2, 1977, pp. 213-220, ISA, U.S.; L. R. Thomas: Thick-Film Platinum Resistance Temperature Detectors, p. 215, paragraphs 2, 3; Figure (iii).

Hybrid Circuit Design and Manufacture, R. D. Jones, Tektronix Laboratories, Beaverton, Oreg., EEE 13; pp. 40-45; pp. 74-75; pp. 124-137.

*Primary Examiner*—Todd E. Deboer
*Attorney, Agent, or Firm*—Foley & Lardner, Schwartz, Jeffery, Schwaab, Mack, Blumenthal & Evans

[57] ABSTRACT

A surge protector, particularly for protecting components in a telecommunications system, has a thin ceramic substrate on a surface of which is formed a surge protection resistor having a serpentine path extending over the substrate, the width of the path and the distance between adjacent path lengths being relatively narrow. Resistance trimming means are provided, positioned such that there is a substantially isothermal heat distribution over the substrate under surge conditions.

34 Claims, 2 Drawing Sheets

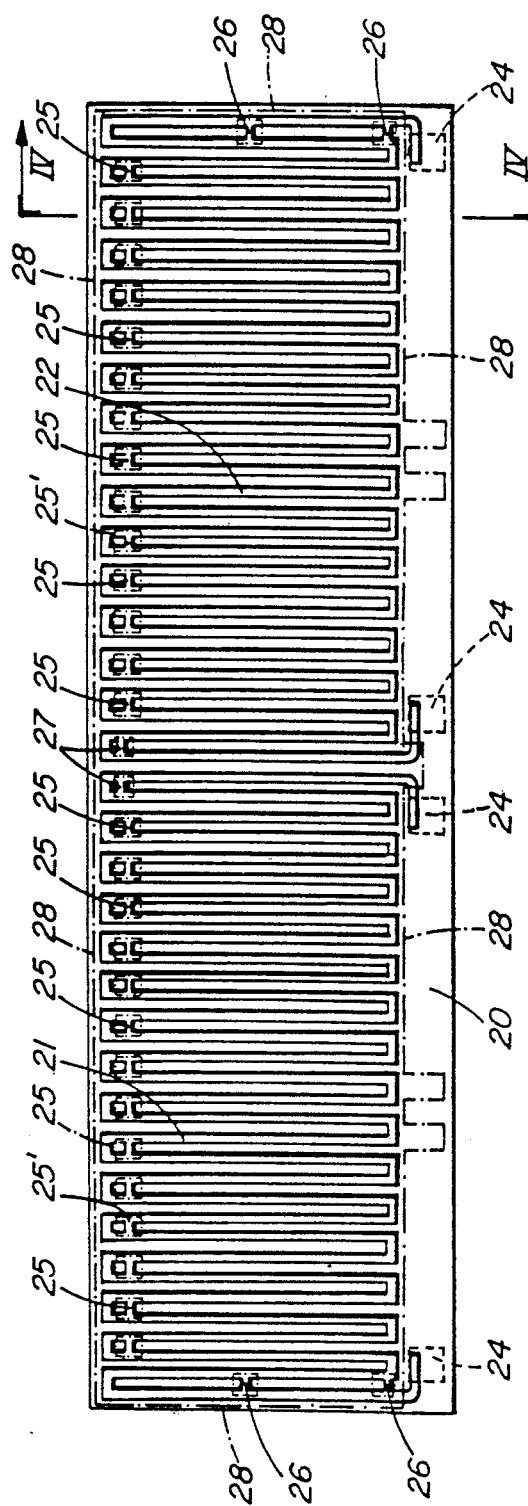
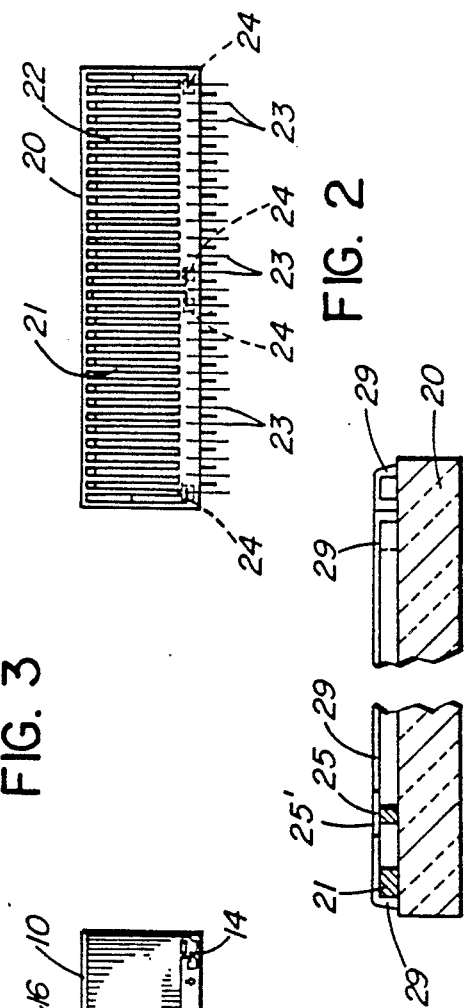
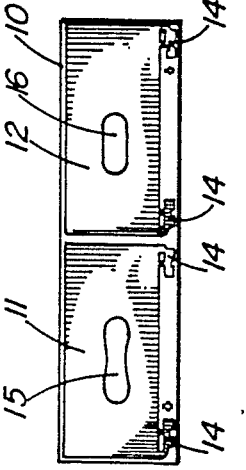
FIG. 3
FIG. 2
FIG. 1 RELATED ART
FIG. 4

SURGE PROTECTOR FOR TELECOMMUNICATIONS SYSTEMS

This application is a continuation of application Ser. No. 06/899,403, filed Aug. 22, 1986 now abandoned.

BACKGROUND OF THE INVENTION

1. Field of the Invention

This invention relates to surge protection for components in a telecommunications system. Particularly, protection is required against AC surges which can arise due to downed AC power lines or other such occurrences. A surge protector for such events is generally known as a surge protection resistor.

2. Related Art

Originally, such protectors comprised a wire wound resistor. However, an overload could cause the resistor to break down in a manner which was a fire hazzard, because of the materials used for manufacture. Wire wound resistors were replaced by a thick film resistor printed onto a surface of a ceramic substrate. The substrate is at least 0.1 inches thick and the resistor is a continuous layer. To trim the value of the resistor, the layer of resist material is abraded locally, the abrasion extending through the layer to the substrate.

By developments in materials and process, it has been found possible to reduce the thickness of the substrate to 0.06 inches, but disadvantages, such as 100% testing, resulted. Further development enabled some easing of test requirements, but the 0.06 inches thickness is still required.

The thickness of the substrate is set by the liability of the substrate to disintegrate under surge conditions, which heat up the protector. A thin substrate will disintegrate at a lower surge voltage level than a thicker substrate. This effect is amplified by variation in the heating of the substrate over the substrate area, particularly arising from the results of trimming.

SUMMARY OF THE INVENTION

The present invention provides a surge protector which has a very even heating over the entire area of the substrate. Broadly, the invention comprises a thin ceramic substrate on one surface of which is formed a surge protection resistor having a serpentine path extending over the substrate, the width of the path and distance between adjacent path lengths being relatively narrow, with resistance trimming means provided at positions such that there is a substantially isothermal heat distribution over the substrate under surge conditions. In one particular arrangement, trimming means are provided at one or more edges.

BRIEF DESCRIPTION OF THE DRAWINGS

The invention will be readily understood by the following description of certain embodiments, by way of example, in conjunction with the accompanying drawings, in which:

FIG. 1 is a plan view on one surface of a related art form of surge protector;

FIG. 2 is a plan view of one form of surge protector in accordance with the present invention;

FIG. 3 is a much enlarged view of the resistor pattern and substrate surface of the surge protector as in FIG. 2;

FIG. 4 is a cross-section on the line IV—IV of FIG. 3; and

DETAILED DESCRIPTION OF THE EMBODIMENTS

Figure 5:
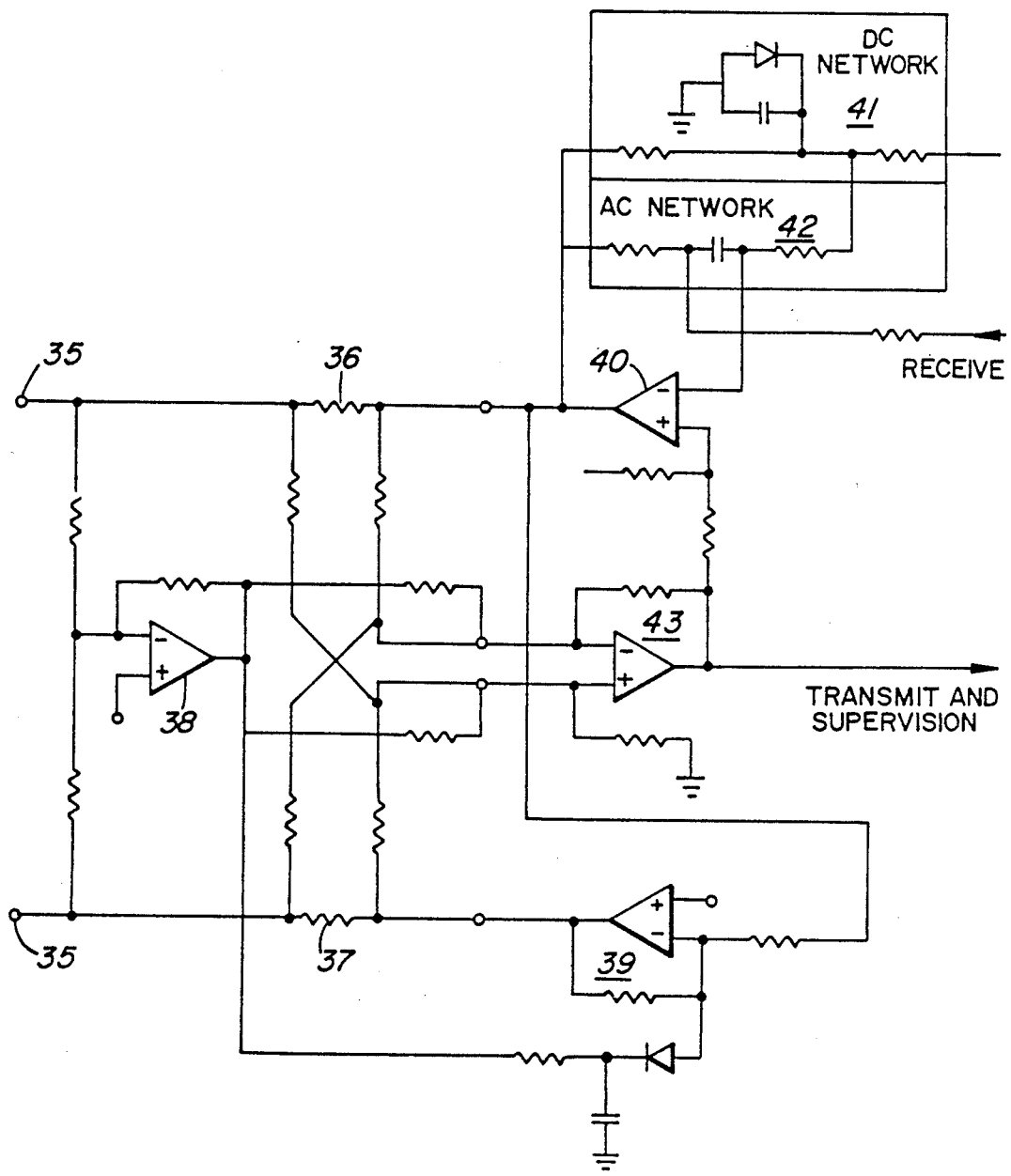
FIG. 5 is an illustration of one form of circuit embodying the invention.

Illustrated in FIG. 1 is a related art form of surge protector, as at present in use. The protector has a ceramic substrate 10 on one surface of which are formed two resistor elements 11 and 12. In telecommunications systems, protection is required for both conductors of the conventional two conductor loop or feed, the Tip conductor and the Ring conductor. Therefore, conveniently two surge protection resistors are formed on a common substrate. The two resistor elements 11 and 12 are of thick film form, the resistors are formed by screen printing a layer of resistor material on the surface of the substrate 10. The resistor material overlies, at each end of an element, a conductive stripe, not seen, which connects at one end to a contact pad 14.

As it is not feasible to form the resistor elements 11 and 12 at exactly the right resistance value, the elements are deliberately formed to have a resistance value slightly lower than that required. The layer of resistor material is then abraded locally, as by sand abrasion, to bring the resistance up to the required value. The layer is abraded through to the substrate, as can be seen in FIG. 1. The abraded areas are indicated at 15 and 16. The values of the resistor elements must be within close limits of the datum or specification value, and the two resistors must be matched, or equal, in resistance to a very close limit.

A severe problem arises in the protector of the form as in FIG. 1. Due to the abrading, the voltage and resultant current flow during the surge condition is concentrated in the two sections either side of the abraded areas 15 and 16. A high level of heating can occur in these two sections while a cool area occurs at each abraded area. This creates a high level of non-uniform heating of the substrate. To withstand this thermal shock requires a minimum thickness of substrate, generally 0.1 inches or more.

Because of this thickness, the substrates are formed, or manufactured, individually. The resistor elements are screen printed on one substrate at a time. This is slow and also costly. Further, to provide protection, the resistor elements are usually covered with a fused dielectric layer, which again is applied individually to substrates. It is not possible to produce multiples of protectors on larger substrates as it is very difficult and expensive to make larger thick substrates and thick substrates cannot readily be divided by scoring and breaking. Process and material developments have provided some amelioration of the surge effects and permitted the substrate to be reduced to 0.06 inches. However, because of the variation in temperature of the substrate under surge conditions, with the possibility of disintegration, every protector is tested to the full range voltage as prescribed by specification. This is in the order of 450 volts AC RMS at 11 Hz. A further stage of development was to provide a different resistor material, a thick film nitrogen fireable material, to give an improved heat dissipation. It was found that the substrate could be maintained at 0.06 inches thickness, but testing of every resistor is not required. Because of the somewhat thinner substrate, it is possible to obtain substrates in larger sizes and a substrate size large enough to form six surge protectors can be obtained.

It then appeared that the limit in the development of the surge protector had been reached. It did not seem likely that any further reduction in substrate thickness was obtainable and the abrasion trimming of the resistor elements still remained a slow, costly, procedure.

The present invention enables a major improvement by a complete break-away from conventional practice. Instead of a layer of resistor material forming an element, a thin serpentine pattern is used for the resistor element. This is a substantial departure from conventional element form. Also, it would appear that the thin or narrow pattern would not be capable of sustaining a voltage surge. It would be expected that a narrow resistor would rapidly burn out at surge voltages. However, this is avoided by making the resistor pattern of a material which has a resistance between a resistor material and a conductor material. A resistor material, for example as used for the resistor elements 11 and 12, typically has a value of about 10 M ohms to 100 M ohms per square, depending upon requirements, while a conductor material typically has a resistance of between about 3 m and about 60 m ohms per square.

FIG. 2 illustrates a completed surge protector having a ceramic substrate 20 and two resistor elements 21 and 22, each of serpentine form on one surface. In the particular example, the serpentine pattern is of a zigzag form and is seen much enlarged in FIG. 3. In the protector as illustrated in FIG. 2, additional components, further small thick film resistors for example, may be formed on the other surface of the substrate. These components connect to a circuit pattern. Connections are made to the circuit pattern and to the resistor elements 21 and 22, by terminals 23 attached by soldering, a typical circuit being illustrated in FIG. 5. Contact pads 24 are seen in both FIGS. 2 and 3 for attachment of terminals. In the example illustrated, for trimming of the resistance value of each element, shorting links are provided along one edge—indicated at 25 in FIG. 3. Further shorting links are provided at each end at 26. Links 26 provide a first, relatively large, level of trimming. Depending upon the measured value of the resistance of an element after manufacture, either one of the links 26, or both links 26, is cut by a laser. A second and much finer level of trimming is provided by laser cutting selected ones of the links 25. Depending upon what links are cut, a variable member of "squares" of resistance path is added to the path of the resistor. A very fine third level trimming is provided by links 27. It will be seen that cutting a link 27 adds in a smaller length, or numbers of squares, than cutting a link 25. Cutting a link 26 adds in many more squares—a much greater path length, than cutting a link 25. If desired, the links 25 and 27 could be provided along the other edge and could also be provided along both edges, although the manufacturing accuracy is such that it is not likely so much trimming ability would be required.

The number of squares of resistor added in by cutting a link can have a particular relationship. Thus cutting a link 25 can add a predetermined number of squares proportional to the number of squares in one complete pair of "legs" in a pattern 21 or 22. In one particular example, cutting a link 26 adds in approximately seventy-seven squares, cutting a link 25 adds five squares and cutting a link 27 adds three and a half squares. These give, respectively, a 2.9%, 0.53% and 0.37% change in value.

The term "squares" is used in the specification of sheet resistance values. It means that if a paste of 1000 ohms/square is screened into a one inch square resistor pattern, it will have a resistance of 1000 ohms from one side to the other side. It will also be 1000 ohms from side to side if the square resistor is one centimeter square or 100 mil square. The size is not important as long as the resistor is square. This is discussed in more detail in "Thick Film Technology" by Jeremy Agnew, published by Hayden Book Company, Inc., of New Jersey, particularly at pages 11, 12 and 13.

It will be appreciated that, whereas in the prior arrangement as in FIG. 1, resistance material is removed to raise the resistance of an element, in the present invention material is added to the resistance path to raise the resistance. This material is added in such a manner that the temperature effect is minimal. In the example illustrated in FIGS. 2 and 3, this material is added at the edges. However, trimming links can be provided at other positions, for example down the center. Effectively, by use of the invention, a substantially uniform temperature rise occurs over the entire substrate under surge conditions.

Typical values for the resistor elements of a protector, are 200 ohms resistance, ±0.5%, with the two resistors matched to ±0.5%. It is required that the temperature coefficient of resistance (TCR) be within the limits of about ±100 ppm. With the present invention, a TCR within the limits of about 40 ppm has been obtained regularly. The continuous power rating is 2,000 mW. The serpentine resistor path is 20 mil wide, with a space of 20 mil between adjacent path lengths.

In the example, the resistance of the resistor path is about 0.2 ohms per square. A variety of materials can be used, such as a ruthinium based material as sold by Electro-Science Laboratories Inc. of Pennsylvania—reference number 3900, and a silver based material as sold by Thick Film Systems Division of Ferro Corp. of Santa Barbara, Calif. The silver based material has been found very effective and is a mixture of silver and borosilicate glass, in paste form. The silver comprises up to about 50% by weight of the mixture, the remainder being the borosilicate glass. Various small additions of other materials such as metal oxides, for example of copper, nickel, magnesium and zinc, may be used to trim the final resistance value of the sintered resistor path. The basic proportions of silver and glass can be varied to vary the resistance of the resistor path.

After printing of the resistor patterns and sintering or fusing of the deposited material, it is normal to apply a dielectric passivation layer, for protection. Holes or openings 25' are left in the layer for access to the links 25, 26 and 27. This provides protection. The dielectric layer outline is indicated by chain-dotted lines 28 in FIG. 3.

Both the resistor material and dielectric are sintered or fused by conventional processes, e.g. at 850° C. for about 10 minutes.

A typical cross-section is seen in FIG. 4, the thicknesses having been magnified for clarity. The dielectric layer is indicated at 29. The dielectric layer will, of course, fill in between path lines, except where hole or opening 25' is seen adjacent link 25 to provide access thereto. The substrate can be as thin as 0.04 inches. This enables substrates up to 5 by 6 inches to be used, enabling twelve protectors to be made per substrate. This thickness of substrate can readily be scored and broken into separate protectors. The cost of substrates decreases with decrease in thickness and also cost of manufacture decreases with the increase in number of protectors which can be made at one time.

A line or path width down to 5 mil and a spacing or gap of 5 mil can be used. For resistor elements having a lower resistance, for example 100 ohms, wider lines and spaces can be used, for example 40 mil. Wider lines and spaces, for example, line or path widths and spacing or gap widths from 5 mil to 100 mil, can be used.

While two resistor elements have been illustrated per substrate, in FIGS. 2 and 3, it is possible to provide a single resistor element, or more than two, if desired.

While a zigzag form of serpentine path is illustrated in FIGS. 2 and 3, other forms of serpentine paths can be used. Thus two parallel spiral paths can be used. The term serpentine is intended to include sinuous and spiral paths and other twisting and winding forms. The paths extend for substantially the entire area of the substrate. The width of path and space or gap between paths can be equal. The paths can be wider than the gaps, for example a 40 mil path and a 20 mil gap or space. The paths, in a zigzag formation as in FIGS. 2 and 3, can extend across the substrate, as shown, or can extend lengthwise of the substrate. Any particular pattern which provides the requirement that substantially isothermal heating occurs under surge conditions is suitable. The trimming arrangements are such that the isothermal heating is substantially unaffected by trimming.

Thus the use of a serpentine resistor pattern having relatively narrow width path and spaces, which is contrary to what would be expected, together with trimming links, provides a surge resistor element having substantially isothermal heating under surge conditions. The resistors can be made to a high standard specification on thinner substrates than hitherto used for such components. It enables the use of substrate material already manufactured for thick film substrates, which use 0.025 and 0.04 inch material. Because of the substantially even heating, the substrate is not in danger of disintegration. It is not necessary to subject every component made to a test to actual surge values.

FIG. 5 illustrates one form of line-card circuit as used in a telecommunications system. This circuit is described in more detail in U.S. Pat. No. 4,571,460, issued Feb. 18, 1986, in the name of the present assignee. In the figure, connection to the telephone lines, from the line card, is made at 35. The surge protection resistors, corresponding to resistor elements 21 and 20 of FIGS. 2 and 3, are indicated at 36 and 37 in FIG. 5. The resistors 36 and 37 act to protect the circuit components against surges occurring on the telephone lines and inputting at the connections 35. Briefly describing other parts of the circuit in FIG. 5, a DC amplifier is shown at 38, a ring amplifier circuit at 39, a tip amplifier at 40, a DC network at 41, an AC network at 42 and a control circuit at 43.

While several embodiments of the invention have been described, it will be understood that it is capable of further modification, and this application is intended to cover any variations, uses, or adaptation of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A surge protector having enhanced capacity to withstand surge conditions, comprising:
   a ceramic substrate;
   a resistive serpentine path comprising adjacent electrically resistive path lengths formed on one surface of the ceramic substrate;
   the width of a path length and the distance between adjacent path lengths being relatively narrow, said path lengths being arranged to substantially evenly distribute surge induced heat on said substrate during surge conditions; and
   a plurality of first trimming means for adjusting total length of said resistive serpentine path, said first trimming means being substantially evenly distributed along a first edge portion of said substrate between adjacent path lengths of said serpentine path, each of said first trimming means providing a substantially equal adjustment to a total resistive value of said serpentine path, so that even after trimming, said path lengths substantially evenly heat said substrate during surge conditions.

2. A surge protector as claimed in claim 1, wherein said ceramic substrate has a thickness of between 0.025 inches and 0.04 inches.

3. A surge protector as claimed in claim 1, wherein said trimming means comprises shorting links between adjacent path lengths in said serpentine.

4. The surge protector of claim 1, wherein said resistive serpentine path is substantially uniformly arranged in a generally rectangular area on said ceramic substrate.

5. A surge protector as claimed in claim 1, wherein said path length has a width between about 5 mil and 100 mil.

6. A surge protector as claimed in claim 1, wherein said distance between adjacent path lengths is between about 5 mil and 100 mil.

7. A surge protector as claimed in claim 1, wherein said width and said distance between adjacent path lengths is substantially equal.

8. A surge protector as claimed in claim 1, wherein said distance between adjacent path lengths is wider than said width.

9. A surge protector as claimed in claim 1, wherein said trimming means includes means for adding a selected amount of length to said serpentine path.

10. A surge protector as claimed in claim 9, wherein said adding means includes shorting means between path length in said serpentine path.

11. A surge protector as claimed in claim 10, wherein said shorting means includes a plurality of shorting connections, arranged mutually along said first edge portion and a second edge portion of said substrate for adding any of a predetermined range of lengths to said serpentine path.

12. A surge protector as claimed in claim 1, including a protective layer over said serpentine path.

13. A surge protector as claimed in claim 12, including means for gaining access to said trimming means.

14. A surge protector as claimed in claim 13, wherein said access gaining means are openings in said protective layer.

15. The surge protector recited in claim 1 wherein each said trimming means in said first plurality of trimming means provides an adjustment of said total resistive value of about 0.53%.

16. The surge protector recited in claim 1, said surge protector comprising:

a last leg of said serpentine remote from a first leg of said serpentine, said first leg of said serpentine being adjacent a second edge portion of said substrate, said second edge portion adjoining said first edge portion;

at least one second trimming means located along said first edge portion between said last leg and an adjacent leg, said second trimming means providing an adjustment of about 0.37% to said total resistive value.

17. The surge protector recited in claim 1 comprising:

a first leg of said serpentine lying adjacent a second edge portion of said substrate, said second edge portion adjoining said first edge;

at least one third trimming means located along said second edge portion between said first leg and an adjacent leg of said serpentine path, each said third trimming means providing an adjustment of about 2.9% to said total resistive value.

18. The surge protector recited in claim 1 wherein said first trimming means are also provided between adjacent path lengths along a third edge portion of said substrate, said third edge portion being remote from said first edge portion.

19. A surge protector as claimed in claim 1, wherein said resistive serpentine path is constructed from a material having electrical conductivity intermediate between a resistor and a conductor.

20. The surge protector recited in claim 19 wherein said material has resistance of about 0.2 ohms per square.

21. A method of protecting components such as in a telecommunications system and the like from voltage surges, comprising:

(a) placing a serpentine electrically resistive path on at least one surface of a ceramic substrate, said path comprising a plurality of narrow adjacent path lengths and a plurality of first trimming links between the path lengths of the serpentine path on a first edge portion of the substrate, each said trimming link providing substantially equal adjustment of a total resistive value of the path to provide substantially even, isothermal heating under voltage surge conditions and;

(b) trimming said serpentine resistive path to a desired resistance value by selectively opening said trimming links;

(c) placing said trimmed serpentine resistive path in an electrical line between a voltage source and a component to be protected.

22. The method of claim 21 including forming the path width of between about 5 mil and 100 mil.

23. The method of claim 21 including placing adjacent path lengths between about 5 mil and 100 mil apart.

24. The method of claim 21 including placing a protective coating over said resistive path.

25. The method of claim 24 including providing openings in said coating for gaining access to said links.

26. The method of claim 21 wherein opening said links increases a length of the resistive path.

27. The method of claim 21 including increasing the length of said resistive path.

28. The method of claim 21 including the step of adjusting said resistive path by trimming at least one of a plurality of shorting links between adjacent path lengths and an edge portion of said substrate.

29. The method of claim 21 including forming said substrate of a ceramic material having a thickness of between about 0.025 inches and 0.04 inches.

30. A surge protector having enhanced capacity to withstand surge conditions, comprising:

a substrate:

a serpentine resistive path formed on said substrate, said resistive path comprising a plurality of adjacent electrically resistive first path length portions and links electrically connecting adjacent pair of said first path length portions, said serpentine resistive path arranged in a first area of said substrate so that under surge conditions said serpentine resistive path substantially evenly heats said first area; and second peripheral path length portions located in a second area of said substrate peripheral of said first area, links electrically shorting said second peripheral path length portions to said first path length portions, said links defining trimming means each trimming means substantially equally increasing total length of said resistive serpentine path;

whereby said serpentine resistive path even after trimming, evenly heats said first area during surges.

31. A surge protector as claimed in claim 30, wherein said first area is generally rectangular and said second area is located along an edge potion of said substrate.

32. A method of protecting components such as in a telecommunications system and the like from voltage surges, comprising:

directing the surge voltage along a resistive path;

evenly heating a first portion of a substrate with a first portion of said electrically resistive path; and obtaining a predetermined resistance in said electrically resistive path with selected additional path length portions located peripherally of said first substrate portion.

33. A surge protector having enhanced capacity to withstand surge conditions, comprising:

a ceramic substrate;

a resistive serpentine path comprising adjacent electrically resistive path lengths formed on one surface of the ceramic substrate, a last leg of said serpentine being remote from a first leg of said serpentine, said first leg of said serpentine being adjacent a second edge portion of said substrate, said second edge portion adjoining a first edge portion of said substrate;

the width of a path length and the distance between adjacent path lengths being relatively narrow, said path lengths being arranged to substantially evenly distribute surge induced heat on said substrate during surge conditions; and a plurality of first trimming means for adjusting total length of said resistive serpentine path, said trimming means being substantially evenly distributed along said first edge portion of said substrate between adjacent path lengths of said serpentine path, each said trimming means providing a substantially equal adjustment of about 0.53 % to a total resistive value of said serpentine path;

at least one second trimming means located along said first edge portion between said last leg and an adjacent leg, said second trimming means providing an adjustment of about 0.37% to said total resistive value;

at least one third trimming means located along said second edge portion between said first leg and an adjacent leg of said serpentine path, each said third trimming means providing an adjustment of about 2.9% to said total resistive value; and wherein, even after trimming, said path lengths substantially evenly heat said substrate during surge conditions.

34. The surge protector recited in claim 33 wherein said first and second trimming means are also provided between adjacent path lengths along a third edge portion of the substrate, said third edge portion being on a side remote from said first edge portion.

* * * * *